United States Patent
Hughes et al.

(10) Patent No.: US 10,741,892 B2
(45) Date of Patent: Aug. 11, 2020

(54) CONTROLLER AND CONTROL METHOD FOR ACTIVATING TEMPERATURE CONTROL OF A DEVICE OF A VEHICLE

(71) Applicant: Jaguar Land Rover Limited, Whitley, Coventry, Warwickshire (GB)

(72) Inventors: Ian Hughes, Coventry (GB); Baptiste Bureau, Coventry (GB)

(73) Assignee: JAGUAR LAND ROVER LIMITED, Coventry, Warwickshi (AE)

( * ) Notice: Subject to any disclaimer, the term of this patent is extended or adjusted under 35 U.S.C. 154(b) by 307 days.

(21) Appl. No.: 15/766,681

(22) PCT Filed: Oct. 26, 2016

(86) PCT No.: PCT/EP2016/075774
§ 371 (c)(1),
(2) Date: Apr. 6, 2018

(87) PCT Pub. No.: WO2017/084840
PCT Pub. Date: May 26, 2017

(65) Prior Publication Data
US 2018/0316069 A1    Nov. 1, 2018

(30) Foreign Application Priority Data

Nov. 18, 2015   (GB) .................................. 1520323.5

(51) Int. Cl.
*H01M 10/625*   (2014.01)
*H01M 10/63*    (2014.01)
(Continued)

(52) U.S. Cl.
CPC ........... *H01M 10/625* (2015.04); *B60L 58/24* (2019.02); *B60L 58/26* (2019.02); *B60L 58/27* (2019.02);
(Continued)

(58) Field of Classification Search
CPC .. H01M 10/625; H01M 10/443; H01M 10/63; B60L 58/26; B60L 58/27; B60L 58/24; Y02T 10/7005
See application file for complete search history.

(56) References Cited

U.S. PATENT DOCUMENTS 8,166,770 B2 *  5/2012  Suzuki .............. B60H 1/00278
                                                   62/186
8,594,871 B2 * 11/2013  Uchida .................. B60L 50/16
                                                   701/22
(Continued)

FOREIGN PATENT DOCUMENTS

JP      2010-166676       *  7/2010
WO  WO 2008/137214 A1    11/2008
WO  WO 2014/177800 A1    11/2014

OTHER PUBLICATIONS

Patents Act 1977: Combined Search and Examination Report under Sections 17 and 18(3), UKIPO Application No. GB1520323.5, dated Apr. 12, 2016, 6 pp.
(Continued)

*Primary Examiner* — Michael J Zanelli
(74) *Attorney, Agent, or Firm* — Miller Nash Graham & Dunn LLP

(57) ABSTRACT

A controller and a control method for activating temperature control of a device of a vehicle, the controller configured to, in a first mode, activate temperature control of the device of the vehicle when a measured temperature of the device passes a first threshold temperature; determine when a condition dependent on a journey of the vehicle is satisfied, and switch from the first mode to a second mode; and, in the second mode, activate the temperature control of the device when the measured temperature of the device passes a second threshold temperature, different to the first threshold temperature, wherein in the second mode, the measured
(Continued)

temperature of the device passes the first threshold temperature without activation of the temperature control of the device before passing the second threshold temperature activating the temperature control of the device.

19 Claims, 5 Drawing Sheets

(51) Int. Cl.
*B60L 58/26* (2019.01)
*B60L 58/27* (2019.01)
*B60L 58/24* (2019.01)

(52) U.S. Cl.
CPC .......... *H01M 10/63* (2015.04); *Y02T 10/705* (2013.01); *Y02T 10/7005* (2013.01)

(56) References Cited

U.S. PATENT DOCUMENTS

| | | |
|---|---|---|
| 2010/0089547 A1 | 4/2010 | King et al. |
| 2010/0304193 A1 | 12/2010 | Karlsson et al. |
| 2011/0309681 A1 | 12/2011 | Kamijima |
| 2014/0174712 A1 | 6/2014 | Yang et al. |
| 2015/0007972 A1 | 1/2015 | Wickert et al. |
| 2015/0100188 A1* | 4/2015 | Wagner ................ H01M 10/48 701/22 |
| 2015/0274030 A1* | 10/2015 | Payne ................ B60L 11/1874 701/22 |

OTHER PUBLICATIONS

International Search Report and Written Opinion of the International Searching Authority, International Application No. PCT/EP2016/075774, dated Feb. 9, 2017, 15 pp.

* cited by examiner

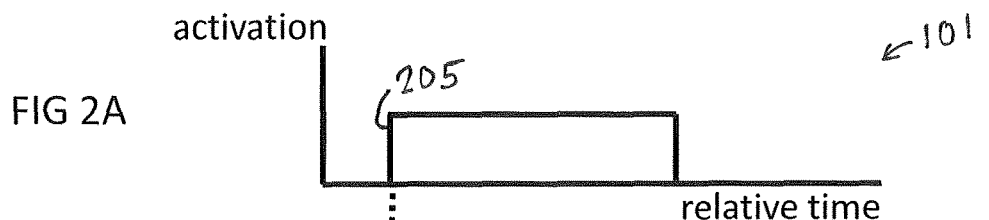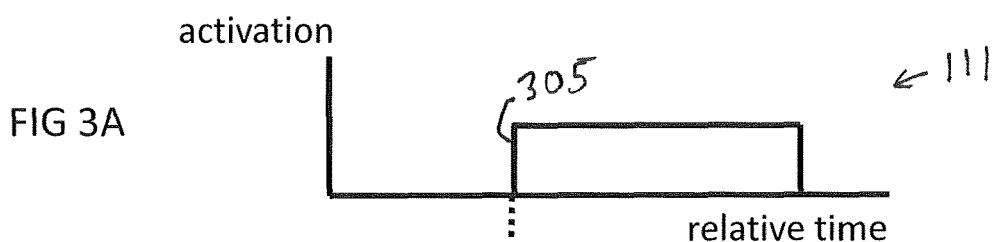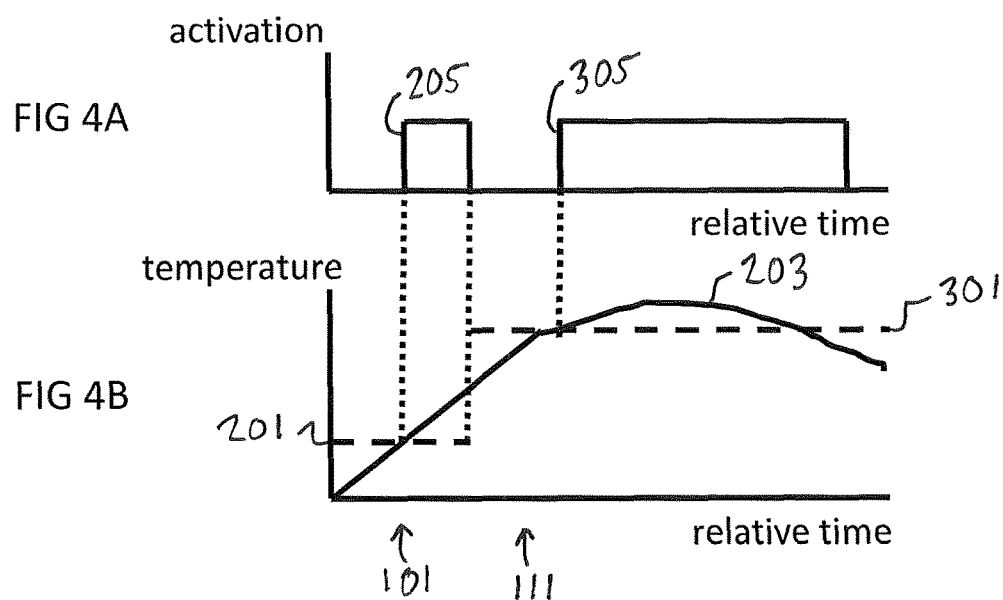

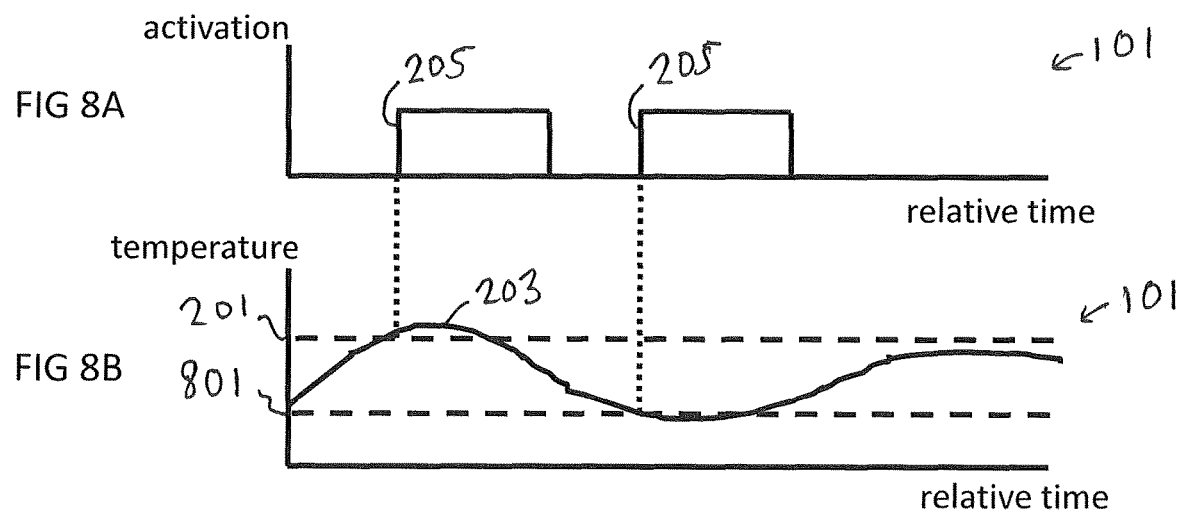
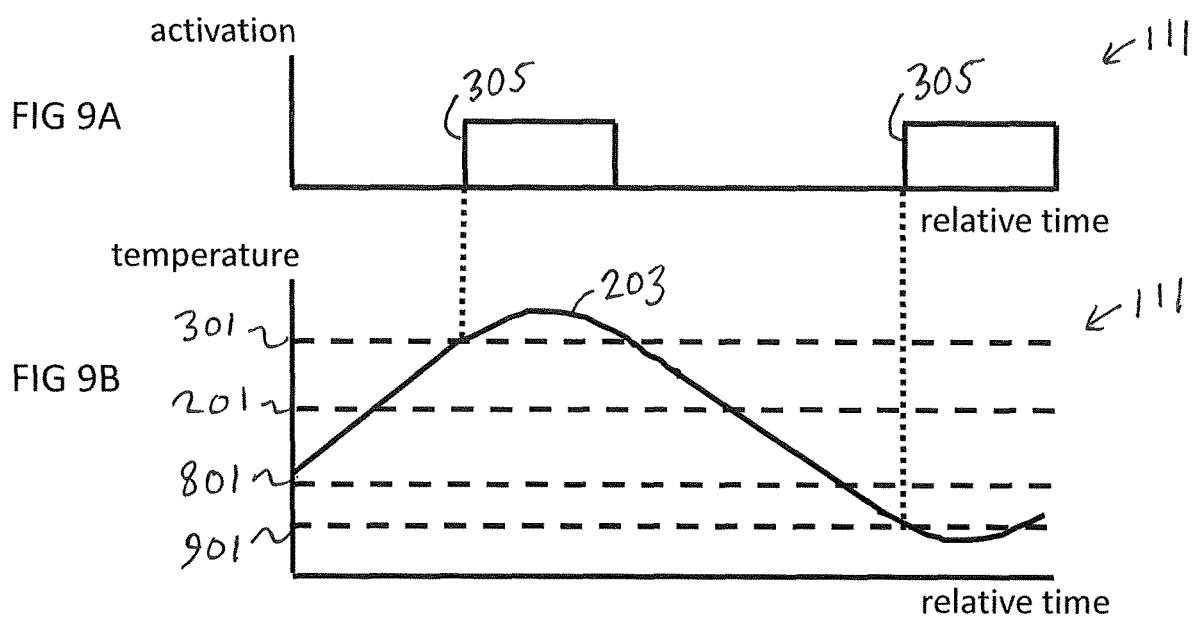

US 10,741,892 B2

CONTROLLER AND CONTROL METHOD FOR ACTIVATING TEMPERATURE CONTROL OF A DEVICE OF A VEHICLE

RELATED APPLICATIONS

This application is a 35 U.S.C. § 371 national stage application of PCT Application No. PCT/EP2016/075774, filed on Oct. 26, 2016, which claims priority from Great Britain Patent Application No. 1520323.5, filed on Nov. 18, 2015, the contents of which are incorporated herein by reference in their entireties. The above-referenced PCT International Application was published in the English language as International Publication No. WO 2017/084840 A1 on May 26, 2017.

TECHNICAL FIELD

The present disclosure relates to a controller and control method and particularly, but not exclusively, to a controller and a control method for activating temperature control of a device of a vehicle. Aspects of the invention relate to a controller, to a device temperature control system, to a vehicle, to a computer program, and to a method.

BACKGROUND

There is a desire to reduce energy consumption in vehicles, particularly electric vehicles (EV) or plug-in hybrid electric vehicles (PHEV), to increase range and reduce range anxiety experienced by vehicle users.

A prior temperature control strategy brings or maintains a temperature of a charge storage device of a vehicle within an optimum temperature range. For example, a temperature of a charge storage device may be brought within an optimum temperature range for charging of the charge storage device in advance of the vehicle reaching the charging point. The optimum temperature range for charging is narrower than an optimum temperature range for vehicle operation.

The prior strategy wastes energy because additional cooling or heating is required to bring or maintain the temperature of the charge storage device within the optimum temperature range for charging.

It is an aim of the present invention to address disadvantages associated with the prior art.

SUMMARY OF THE INVENTION

Aspects and embodiments of the invention provide a controller, a device temperature control system, a vehicle, a computer program and a method as claimed in the appended claims.

According to another aspect of the invention there is provided a controller for activating temperature control of a device of a vehicle, the controller comprising:
  means for, in a first mode, activating temperature control of the device of the vehicle when a measured temperature of the device passes a first threshold temperature;
  means for determining when a condition dependent on a journey of the vehicle is satisfied, and switching from the first mode to a second mode; and
  means for, in the second mode, activating the temperature control of the device when the measured temperature of the device passes a second threshold temperature, different to the first threshold temperature, wherein in the second mode, the measured temperature of the device passes the first threshold temperature without activation of the temperature control of the device before passing the second threshold temperature activating the temperature control of the device. Using the second mode reduces energy consumption, and may increase a range of the vehicle, reducing range anxiety in vehicle users.

According to yet another aspect of the invention there is provided a controller, for activating temperature control of a device of a vehicle, the controller comprising:
at least one processor; and
at least one memory including computer program code;
the at least one memory and the computer program code configured to, with the at least one processor, cause the controller at least to perform:
  in a first mode, activating temperature control of the device of the vehicle when a measured temperature of the device passes a first threshold temperature;
  determining when a condition dependent on a journey of the vehicle is satisfied, and switching from the first mode to a second mode; and
  in the second mode, activating the temperature control of the device when the measured temperature of the device passes a second threshold temperature, different to the first threshold temperature, wherein in the second mode, the measured temperature of the device passes the first threshold temperature without activation of the temperature control of the device before passing the second threshold temperature activating the temperature control of the device.

According to a further aspect of the invention there is provided a method for activating temperature control of a device of a vehicle, comprising:
  in a first mode, activating temperature control of the device when a measured temperature of the device passes a first threshold temperature;
  determining when a condition dependent on a journey of the vehicle is satisfied, and switching from the first mode to a second mode; and
  in the second mode, activating the temperature control of the device when the measured temperature of the device passes a second threshold temperature, different to the first threshold temperature, wherein in the second mode, the measured temperature of the device passes the first threshold temperature without activation of the temperature control of the device before passing the second threshold temperature activating the temperature control of the device.

In the first mode, activating temperature control of the device of the vehicle may occur when a measured temperature of the device is greater than a first threshold temperature and in the second mode activating the temperature control of the device when the measured temperature of the device is greater than the second threshold temperature.

The device may be an energy storage device or a charge storage device for providing energy for propulsion of the vehicle.

Switching from the first mode to the second mode may comprise deactivating the temperature control of the device if the temperature control is activated.

The condition dependent on the journey of the vehicle may be dependent on a determination of at least one journey parameter that varies as the vehicle approaches a journey destination. The determination of the at least one journey parameter may comprise determining a distance of the vehicle from the journey destination, and/or predicting a time required for the vehicle to reach the journey destination. The condition dependent on the journey may be dependent upon a heating/cooling model of the device based on a predicted journey of the vehicle to a journey destination. The condition dependent on the journey may be dependent upon a damage model of the device. The journey parameter, heating/cooling model and damage model enable switching to the second mode at a point appropriate to a specific journey.

The second threshold temperature may be varied. Advantages of varying the second threshold temperature include controlling the rate of temperature change of the device, and enabling continued use of the second mode without damaging the device, in spite of unexpected changes to the journey of the vehicle.

The controller and/or method may perform the following: in the first mode, activating the temperature control of the device of the vehicle when the measured temperature of the device passes a third threshold temperature; determining when a condition dependent on the journey of the vehicle is satisfied, and switching from the first mode to the second mode; and in the second mode, activating the temperature control of the device when the measured temperature of the device passes a fourth threshold temperature, different to the third threshold temperature, wherein in the second mode, the measured temperature of the device passes the third threshold temperature without activation of the temperature control of the device before passing the fourth threshold temperature activating the temperature control of the device. Using third and fourth threshold temperatures further reduces energy consumption, and may increase a range of the vehicle, reducing range anxiety in vehicle users.

According to a still further aspect of the invention there is provided a device temperature control system, for a device of a vehicle, the system comprising: a heating or cooling system for temperature control of the device; and a controller for the heating or cooling system as described herein.

The system may comprise a charge storage device, wherein the device is the charge storage device.

The system may comprise a vehicle navigation system, for providing information used for determining when the condition dependent on a journey of the vehicle is satisfied.

According to a still further aspect of the invention there is provided a vehicle comprising the controller, or the device temperature control system.

According to a still further aspect of the invention, there is provided a computer program comprising instructions that, when executed by a processor, causes one or more of the methods described herein to be performed.

According to a still further aspect of the invention there is provided a non-transitory computer readable medium storing a computer program comprising computer program instructions that, when performed by one or more processors, causes one or more of the methods described herein to be performed.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which:

FIG. 2B illustrates an example of a measured temperature passing a first threshold temperature and FIG. 2A illustrates a corresponding activation of temperature control according to a first mode;

FIG. 3B illustrates an example of a measured temperature passing a second threshold temperature and FIG. 3A illustrates a corresponding activation of temperature control according to second mode;

FIG. 4B illustrates an example of a measured temperature passing a first threshold temperature and then a second threshold temperature and FIG. 4A illustrates corresponding activation of temperature control according to a first mode and then according to a second mode;

FIG. 8B illustrates an example of a measured temperature passing a first threshold temperature and then a third threshold temperature and FIG. 8A illustrates corresponding activations of temperature control according to a first mode; and FIG. 9B illustrates an example of a measured temperature passing a second threshold temperature and then a fourth threshold temperature and FIG. 9A illustrates corresponding activations of temperature control according to a second mode.

DETAILED DESCRIPTION

Examples in the present disclosure relate to activating temperature control of a device of a vehicle according to a first mode or a second mode. Some examples relate to monitoring a charge storage device in a vehicle such as an EV or a PHEV.

Figure 1:
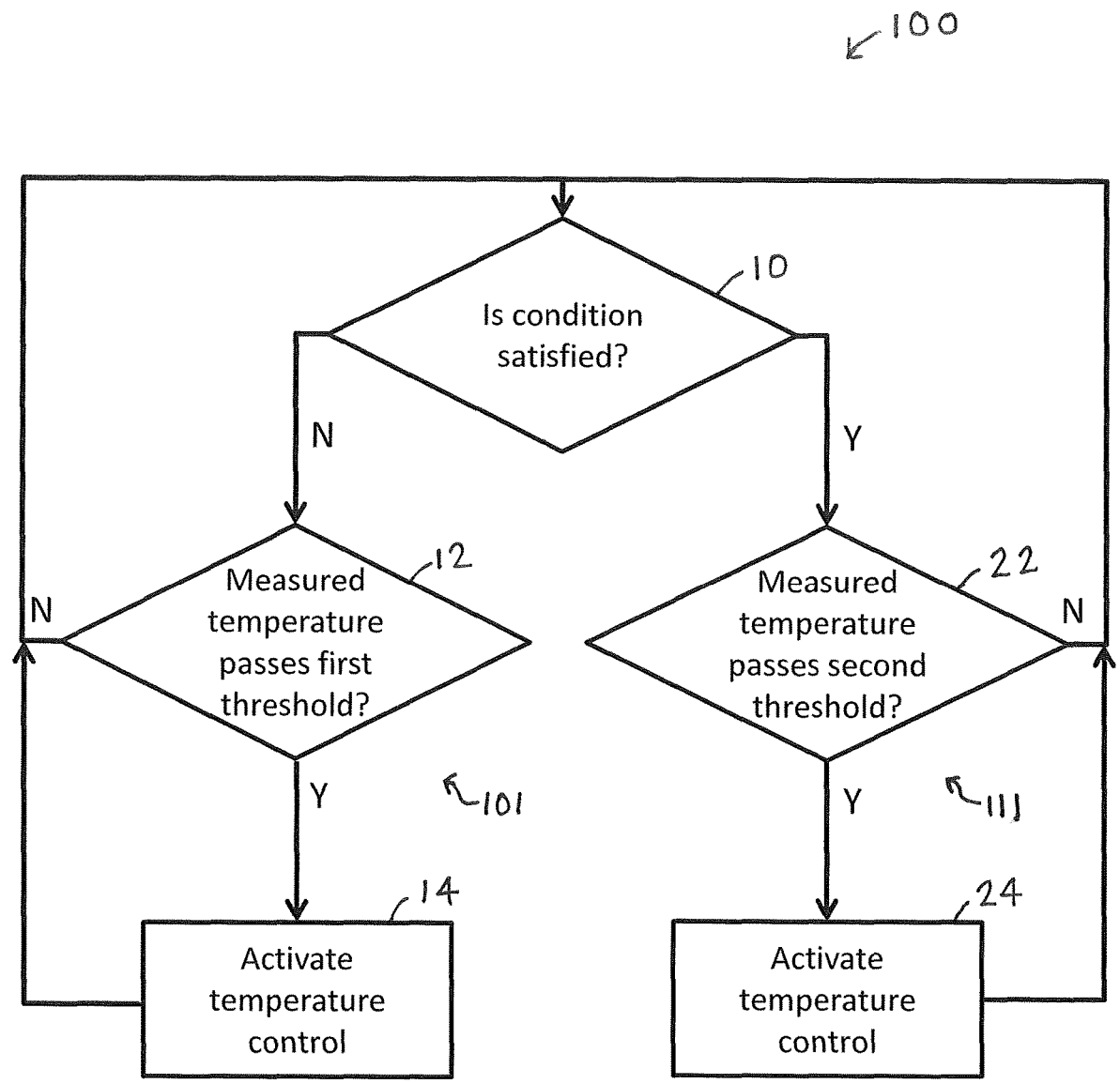
FIG. 1 illustrates an example of a method.
Figure 6:
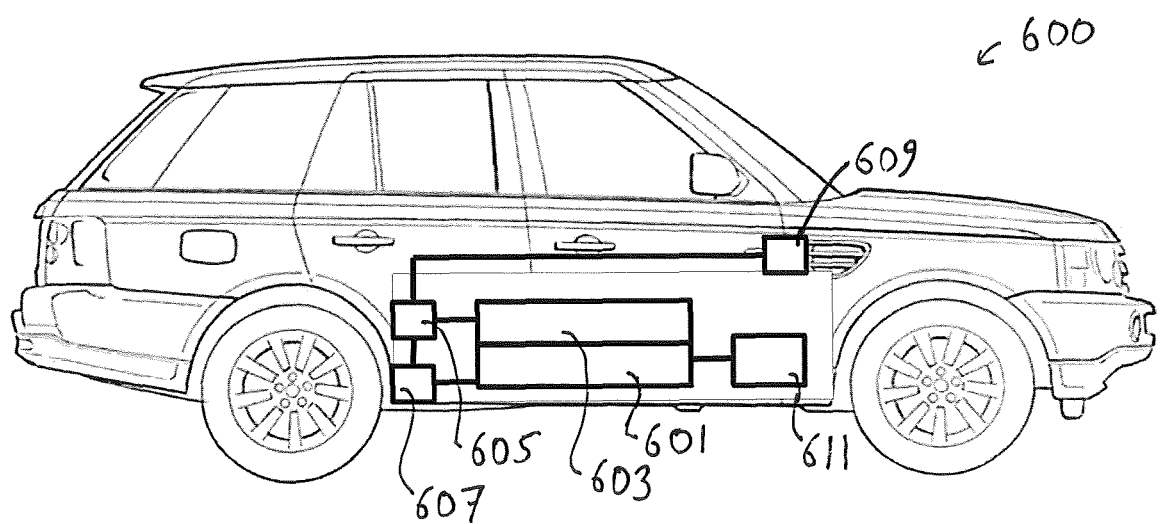
FIG. 6 illustrates an example of a vehicle.

It will be helpful when initially describing an example of a method 100 for activating temperature control of a device of a vehicle to refer to features of FIGS. 1, 2A, 2B, 3A, 3B and 6. FIG. 1 describes a flow-diagram for controlling activation of temperature control of a device of a vehicle. FIG. 2B shows an example of a measured temperature 203 of the device passing a first threshold temperature 201 and FIG. 2A shows a corresponding activation 205 of temperature control according to a first mode 101. FIG. 3B shows an example of the measured temperature 203 of the device passing a second threshold temperature 301 and FIG. 3A shows a corresponding activation 305 of temperature control according to a second mode 111. FIG. 6 illustrates an example of a vehicle 600 comprising a temperature controller 603 for providing temperature control of a device 601.

These Figs illustrate a method 100 comprising: in a first mode 101, activating 14 temperature control of the device 601 when a measured temperature 203 of the device 601 passes a first threshold temperature 201; determining 10 when a condition dependent on a journey of the vehicle 600 is satisfied, and switching from the first mode 101 to a second mode 111; and in the second mode 111, activating 24 the temperature control of the device 601 when the measured temperature 203 of the device 601 passes a second threshold temperature 301, different to the first threshold temperature 201, wherein in the second mode 111, the measured temperature 203 of the device 601 passes the first threshold temperature 201 without activation of the temperature control of the device 601 before passing the second threshold temperature 301 activating the temperature control of the device 601.

FIG. 1 illustrates an example of the method 100, in the form of a flow-diagram for controlling activation of temperature control of a device 601 of a vehicle 600 according to different modes.

Each block represents any suitable means for performing the function described in relation to that block, which may, for example, include hardware means, software means or a combination of hardware means and software means.

At block 10, the method 100 determines whether or not a condition dependent on a journey of the vehicle 600 is satisfied. If the condition is not satisfied, the method 100 branches to enter a first mode 101 and performs blocks 12, 14 before returning to block 10. If the condition is satisfied, the method 100 branches to enter a second mode 111 and performs blocks 22, 24 before optionally returning to block 10. The block 10 therefore operates as a switch selecting the first mode 101 or the second mode 111 and enabling switching between modes depending upon whether the condition is or is not satisfied.

Although only two modes are illustrated in FIG. 1, in other examples, the switching block 10 may select any one of multiple different modes each of which is associated with a different condition and a different threshold temperature.

At block 12, it is determined whether or not a measured temperature 203 passes a first threshold 201.

If the measured temperature 203 of the device 601 does not pass the first threshold temperature 201, then temperature control of the device 601 of the vehicle 600 is not required at this time and the method 100 returns to block 10, optionally with a delay.

If the measured temperature 203 of the device 601 passes the first threshold temperature 201, then temperature control of the device 601 of the vehicle 600 is required at this time and the method 100 moves to block 14 activating temperature control of the device 601 of the vehicle 600.

At block 22, it is determined whether or not a measured temperature 203 passes a second threshold 301.

If the measured temperature 203 of the device 601 does not pass the second threshold temperature 301, then temperature control of the device 601 of the vehicle 600 is not required at this time and the method 100 optionally returns to block 10, optionally with a delay.

If the measured temperature 203 of the device 601 passes a second threshold temperature 301, then temperature control of the device 601 of the vehicle 600 is required at this time and the method 100 moves to block 24 activating temperature control of the device 601 of the vehicle 600.

In some, but not necessarily all examples, a measured temperature 203 passes a first threshold 201 when the measured temperature 203 has a value greater than an upper threshold value. In these examples, the method 100 at block 14, 24 performs temperature control by cooling the device 601 of the vehicle 600.

In some, but not necessarily all examples, a measured temperature 203 passes a first threshold 201 when the measured temperature 203 has a value less than a lower threshold value. In these examples, the method 100 at block 14, 24 performs temperature control by warming the device 601 of the vehicle 600.

The second threshold temperature 301 is different to the first threshold temperature 201. In the second mode, as illustrated in FIG. 3B, the measured temperature 203 of the device 601 passes the first threshold temperature 201 without activation of the temperature control of the device 601 before passing the second threshold temperature 301 activating the temperature control of the device 601.

Therefore during the second mode 111 the temperature control is no longer activated while the measured temperature 203 of the device 601 is between the first threshold temperature 201 and the second threshold temperature 301. This reduces energy consumption. This may increase a range of the vehicle 600, and reduce range anxiety in EV or PHEV users.

In some, but not necessarily all, examples the condition dependent on a journey of the vehicle 600 is satisfied when the vehicle 600 is close to a journey destination at which the device 601 may cool or warm, or at which external energy may be provided to the vehicle 600, for example via a charger, to power the temperature control. Closeness to a destination may for example be measured in terms of distance, time or expected energy consumption before arrival for example.

In some, but not necessarily all, examples the condition is satisfied when the vehicle 600 is sufficiently close to the journey destination that switching to the second mode 111 would not damage the device 601 or cause any other problems for vehicle users.

In some, but not necessarily all, examples, block 10 determining when the condition is satisfied additionally occurs between any of the blocks shown in the method 100, for example optionally between blocks 12 and 14, and/or between blocks 22 and 24.

In some, but not necessarily all, examples blocks 14 and 24 refer to the activation of the same temperature control. Alternatively blocks 14 and 24 may refer to different levels of temperature control. In some, but not necessarily all, examples block 14 represents activation of low energy or passive temperature control and block 24 represents activation of high energy or active temperature control.

In some, but not necessarily all, examples the temperature control is deactivated when the measured temperature 203 of the device 601 changes such that it is no longer past the threshold temperature relevant to the current mode, or when the measured temperature 203 reaches a target temperature.

It should be appreciated that "passing" a threshold temperature 201, 301 when used in relation to the measured temperature 203 may refer to a point in time at which the measured temperature 203 changes to become identical to the threshold temperature, or to a subsequent point in time at which the measured temperature 203 is in excess of the threshold temperature.

FIG. 2B shows an example of a measured temperature 203 varying during a journey and passing a first threshold temperature 201 and FIG. 2A shows a corresponding activation 205 of temperature control according to a first mode 101 when the measured temperature 203 passes the first threshold temperature 201. The temperature scale may refer to increasing or decreasing temperatures. Measured temperatures are shown with solid lines, and threshold temperatures are shown with horizontal dashed lines.

The effects of the temperature control are also illustrated in FIGS. 2A and 2B. The temperature control reduces the difference between the measured temperature 203 and the first threshold temperature 201 until the measured temperature 203 no longer passes the first threshold temperature 201 (or a target temperature) and the temperature control is consequently deactivated. While deactivation of temperature control is as a consequence, in this example, of the measured temperature 203 no longer passing the first threshold temperature 201 (or a target temperature), other deactivation conditions may be used.

FIG. 3B shows an example of a measured temperature 203 varying during a journey and passing a second threshold temperature 301 and FIG. 3A shows a corresponding activation 305 of temperature control according to a second mode 111 when the measured temperature 203 passes the second threshold temperature 301. The temperature scale may refer to increasing or decreasing temperatures. Measured temperatures are shown with solid lines, and threshold temperatures are shown with horizontal dashed lines. The measured temperature 203 of the device 601 passes the first threshold temperature 201 without activation of the temperature control of the device 601 before passing the second threshold temperature 301 activating the temperature control of the device 601.

The effects of the temperature control are also illustrated in FIGS. 3A and 3B. The temperature control reduces the difference between the measured temperature 203 and the second threshold temperature 301 until the measured temperature 203 no longer passes the second threshold temperature 301 (or a target temperature) and the temperature control is consequently deactivated. While deactivation of temperature control is as a consequence, in this example, of the measured temperature 203 no longer passing the second threshold temperature 301 (or a target temperature), other deactivation conditions may be used.

In FIGS. 2B and 3B, the first threshold temperature 201 and the second threshold temperature 301 are constant over time. In other examples, one or both of the first threshold temperature 201 and the second threshold temperature 301 may be varied over time.

FIGS. 4A and 4B illustrate a consequence of a change in mode. FIG. 4B shows an example of a measured temperature 203 varying during a journey. The temperature scale may refer to increasing or decreasing temperatures. Measured temperatures are shown with solid lines, and threshold temperatures are shown with horizontal dashed lines.

The measured temperature 203 initially passes a first threshold temperature 201, during the first mode 101, and FIG. 4A shows a corresponding activation of temperature control according to the first mode 101 when the measured temperature 203 passes the first threshold temperature 201.

Subsequently the condition dependent upon a journey of the vehicle 600 is satisfied and the mode switches from the first mode 101 to the second mode 111. As illustrated in FIG. 4B, the measured temperature 203 of the device 601 is not past the second threshold temperature 301 at this time and temperature control is deactivated as illustrated in FIG. 4A. Therefore in the example of FIG. 4B, switching from the first mode 101 to the second mode 111 comprises deactivating the temperature control of the device 601 if the temperature control is activated.

Subsequently, the measured temperature 203 passes the second threshold temperature 301 as illustrated in FIG. 4B and there is a corresponding activation of temperature control according to the second mode 111, as illustrated in FIG. 4B, when the measured temperature 203 passes the second threshold temperature 301.

There is therefore a period, during the second mode 111, where measured temperature 203 of the device 601 passes the first threshold temperature 201 without activation of the temperature control of the device 601 before passing the second threshold temperature 301 activating the temperature control of the device 601.

The effects of the temperature control are also illustrated in FIGS. 4A and 4B. The temperature control in the second mode 111 reduces the difference between the measured temperature 203 and the second threshold temperature 301 until the measured temperature 203 no longer passes the second threshold temperature 301 (or a target temperature) and the temperature control is consequently deactivated.

While deactivation of temperature control is as a consequence, in this example, of the measured temperature 203 no longer passing the first threshold temperature 201 (or a target temperature), other deactivation conditions may be used.

Although FIGS. 3B and 4B show that the measured temperature 203 passes the second threshold temperature 301 in the second mode 111, this need not always occur. In some examples, temperature control in the second mode does not occur.

Figure 5:
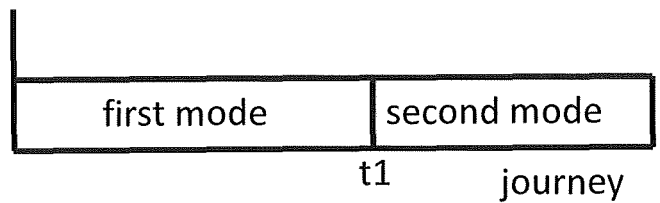
FIG. 5 illustrates an example of switching from a first mode to a second mode within a journey.

FIG. 5 illustrates a change in mode during a journey of the vehicle 600. The x-axis represents a journey from an origin to a journey destination and could be expressed in units of time or distance or energy consumption between two locations, or any other suitable journey measurement.

FIG. 5 illustrates a first mode 101 during a first portion of the journey. It should be understood that the method 100 operates in the first mode 101 during the first portion of the journey because the condition dependent on the journey is not satisfied during the first portion of the journey.

FIG. 5 illustrates a second mode 111 during a second portion of the journey. It should be understood that the method 100 operates in the second mode 111 during the second portion of the journey because the condition dependent on the journey has been satisfied and the method 100 has switched from the first mode 101 to the second mode 111 at time t1.

FIG. 6 illustrates a terrestrial vehicle 600. The vehicle 600 may be an EV or a PHEV. As illustrated in FIG. 6, the vehicle 600 comprises a device 601, which is optionally a charge storage device. The charge storage device is for providing energy for propulsion of the vehicle 600 by powering one or more wheel axles. However, the device 601 is not limited to a charge storage device, and device 601 may be any type of vehicle device for which a temperature is controlled during use.

In some, but not necessarily all examples, the device 601 comprises a charge storage device and the vehicle 600 of FIG. 6 further comprises propulsion means 611 for converting energy stored in the charge storage device to propulsion energy. For example the propulsion means 611 comprises one or more electric motors for powering one or more wheel axles and providing tractive force to wheels of the vehicle 600.

The vehicle 600 of FIG. 6 further comprises a temperature controller 603. The temperature controller 603 is integral to or separate from the device 601. The temperature controller 603 acts as a source and/or sink for thermal energy of the device 601. The temperature controller 603 may be a heating and/or cooling system for the device 601. The heating and/or cooling system optionally comprises a low energy or passive cooling subsystem and/or comprises a high energy or active cooling subsystem. The heating and/or cooling system may employ at least one of: heaters; fans; a refrigerant loop, or any other heating and/or cooling component capable of activation.

In the example of FIG. 6, but not necessarily all examples, the vehicle 600 further comprises a controller 605 configured to control the temperature controller 603. The controller 605 is adapted to transmit a control signal to the temperature controller 603 to activate heating/cooling of the device 601. Control signals may also be transmitted to cause deactivation of heating/cooling of the device 601 if the controller 605 determines that activation of temperature control is no longer necessary.

In the example of FIG. 6, but not necessarily all examples, the vehicle 600 further comprises a detector 607 for measuring a temperature (measured temperature 203) of the device 601. The detector 607 is integral to or separate from the device 601. The detector 607 may be a temperature sensor. The detector 607 is in communication with the controller 605 and provides a measured temperature 203 to the controller 605.

In the example of FIG. 6, but not necessarily all examples, the vehicle 600 further comprises a vehicle navigation system 609 for providing navigation information to the controller 605. The navigation information system 609 provides information to the controller 605 used by the controller 605 to determine when the condition dependent on a journey of the vehicle 600 is satisfied. The vehicle navigation system 609 comprises a satellite navigation device, a mobile telephone or any other suitable device capable of communication with the controller 605. It should be appreciated that vehicle navigation system 609 may comprise a learning algorithm and may be configured to store navigation information concerning historic journeys.

Figure 7:
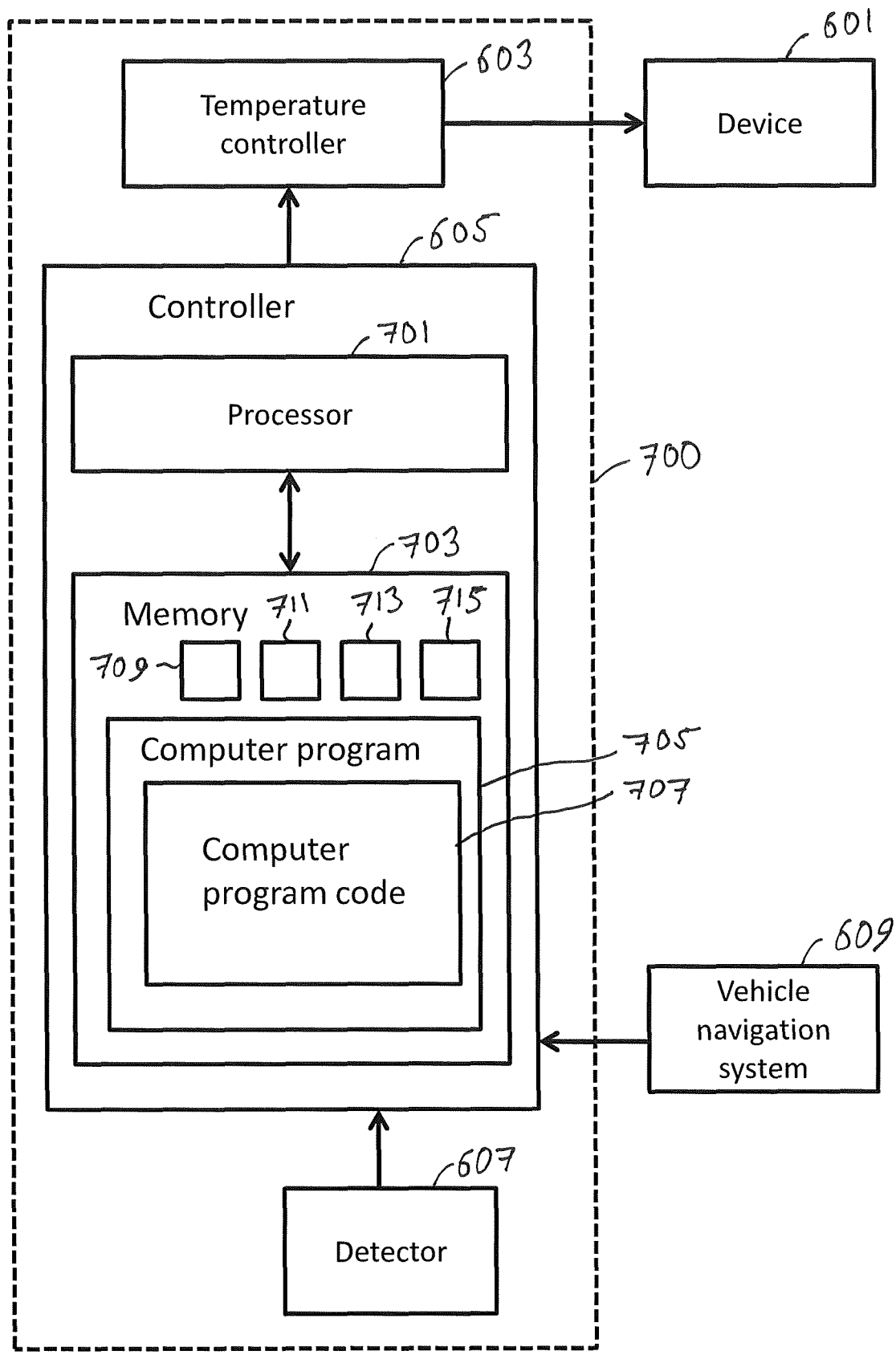
FIG. 7 illustrates an example of a device temperature control system.

FIG. 7 illustrates a device temperature control system 700. The vehicle 600 may comprise the device temperature control system 700.

The system 700 comprises a temperature controller 603, a controller 605, and detector 607. The system 700 optionally comprises the device 601 and/or the vehicle navigation system 609. The controller 605 comprises means for carrying out the method 100.

For purposes of this disclosure, it is to be understood that the controller(s) 605 described herein can each comprise a control unit or computational device having one or more electronic processors. A vehicle 600 and/or a system 700 thereof may comprise a single control unit or electronic controller or alternatively different functions of the controller(s) may be embodied in, or hosted in, different control units or controllers. A set of instructions could be provided which, when executed, cause said controller(s) or control unit(s) to implement the control techniques described herein (including the described method(s)). The set of instructions may be embedded in one or more electronic processors, or alternatively, the set of instructions could be provided as software to be executed by one or more electronic processor(s). For example, a first controller may be implemented in software run on one or more electronic processors, and one or more other controllers may also be implemented in software run on or more electronic processors, optionally the same one or more processors as the first controller. It will be appreciated, however, that other arrangements are also useful, and therefore, the present disclosure is not intended to be limited to any particular arrangement. In any event, the set of instructions described above may be embedded in a computer-readable storage medium (e.g., a non-transitory storage medium) that may comprise any mechanism for storing information in a form readable by a machine or electronic processors/computational device, including, without limitation: a magnetic storage medium (e.g., floppy diskette); optical storage medium (e.g., CD-ROM); magneto optical storage medium; read only memory (ROM); random access memory (RAM); erasable programmable memory (e.g., EPROM ad EEPROM); flash memory; or electrical or other types of medium for storing such information/instructions.

The controller 605 may be a chip or a chip set. As illustrated in FIG. 7 the controller 605 may be implemented using instructions that enable hardware functionality, for example, by using executable instructions 707 of a computer program 705 in a general-purpose or special-purpose processor 701. The computer program 705 may be stored on a computer readable storage medium (disk, memory 703 etc) to be executed by such a processor 701.

The processor 701 is configured to read from and write to the memory 703. The processor 701 may also comprise an output interface via which data and/or commands are output by the processor 701 and an input interface via which data and/or commands are input to the processor 701.

The memory 703 stores a computer program 705 comprising computer program instructions 707 that control the operation of the controller 605 when loaded into the processor 701. The computer program instructions 707, of the computer program 705, provide the logic and routines that enables the system to perform the method 100 as previously described and/or as illustrated in FIG. 1. The processor 701 by reading the memory 703 is able to load and execute the computer program 705.

The controller 605, for activating temperature control of a device 601 of a vehicle 600, therefore comprises:
at least one processor 701; and
at least one memory 703 including computer program code 705;
the at least one memory 703 and the computer program code 705 configured to, with the at least one processor 701, cause the controller 605 at least to perform:
in a first mode 101, activating 14 temperature control of the device 601 of the vehicle 600 when a measured temperature 203 of the device 601 passes a first threshold temperature 201;
determining 10 when a condition dependent on a journey of the vehicle 600 is satisfied, and switching from the first mode 101 to a second mode 111; and
in the second mode 111, activating 24 the temperature control of the device 601 when the measured temperature 203 of the device 601 passes a second threshold temperature 301, different to the first threshold temperature 201, wherein in the second mode 111, the measured temperature 203 of the device 601 passes the first threshold temperature 201 without activation of the temperature control of the device 601 before passing the second threshold temperature 301 activating the temperature control of the device 601.

The computer program 705 may arrive at the controller 605 via any suitable delivery mechanism. The delivery mechanism may be, for example, a non-transitory computer-readable storage medium, a computer program product, a memory device, a record medium such as a compact disc read-only memory (CD-ROM) or digital versatile disc (DVD), an article of manufacture that tangibly embodies the computer program 705. The delivery mechanism may be a signal configured to reliably transfer the computer program 705. The controller 605 may propagate or transmit the computer program 705 as a computer data signal.

Although the memory 703 is illustrated as a single component/circuitry it may be implemented as one or more separate components/circuitry some or all of which may be integrated/removable and/or may provide permanent/semi-permanent/dynamic/cached storage.

Although the processor 701 is illustrated as a single component/circuitry it may be implemented as one or more separate components/circuitry some or all of which may be integrated/removable. The processor 701 may be a single core or multi-core processor.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

The blocks illustrated in FIG. 1 may represent steps in a method and/or sections of code in the computer program 705. The illustration of a particular order to the blocks does not necessarily imply that there is a required or preferred order for the blocks and the order and arrangement of the blocks may be varied. Furthermore, it may be possible for some blocks to be omitted.

As illustrated in the example of FIG. 7, the elements 601, 603, 605, 607, 609, 701, 703 are operationally coupled to each other and any number or combination of intervening elements can exist between them (including no intervening elements).

In other examples, the elements 601, 603, 605, 607, 609, 701, 703 may be operationally coupled to other elements not illustrated in the example of FIG. 7.

In some, but not necessarily all examples, the vehicle 600 comprises a communication network, such as a CAN-bus or Flexway® bus, enabling two or more of elements 601, 603, 605, 607, 609, 701, 703 of FIG. 7, to communicate with each other.

In some, but not necessarily all examples, the memory 703 is configured to store at least one journey parameter 709, and/or a heating/cooling model 711, and/or a damage model 713, and/or threshold temperature information 715, which can be loaded by a processor 701.

In some, but not necessarily all examples at least one journey parameter 709 is determined. The journey parameter 709 is a parameter that varies as the vehicle 600 approaches a journey destination. The condition dependent on the journey of the vehicle 600 is dependent on the determination of an at least one journey parameter 709.

In some, but not necessarily all examples the at least one journey parameter 709 comprises a distance of the vehicle 600 from the journey destination, and/or a time (or energy consumption) required for the vehicle 600 to reach the journey destination.

In some but not necessarily all examples the condition dependent on the journey is a condition dependent upon a predefined threshold distance and/or a predefined threshold time and/or a predefined threshold energy consumption. The method 100, at block 10, determines a distance and/or time and/or energy consumption to a journey destination and switches from the first mode 101 to the second mode 111 if this is less than the respective predefined threshold distance and/or a predefined threshold time and/or a predefined threshold energy consumption. The journey parameter 709 provides advantages such as enabling switching to the second mode 111 at a point appropriate to a specific journey.

In some, but not necessarily all examples, determining a journey parameter 709 relies on information from vehicle navigation system 609. Any information that affects a distance and/or time and/or energy consumption for a vehicle 600 to reach a journey destination can be used. For example, suitable information comprises one or more of: the location of the vehicle 600 and the journey destination; navigation information from the vehicle location to the journey destination; a level and/or speed of traffic along the remaining journey; speed limits along the remaining journey; a current, start or end date and/or time of the journey; geographical features along the journey such as gradients or bends, obstacles or speed control measures; weather conditions outside the vehicle 600; received travel disruption information; a range of the vehicle 600; one or more journey waypoints.

In some, but not necessarily all examples a heating/cooling model 711 is determined. The heating/cooling model 711 is based on a predicted journey of the vehicle 600 to the journey destination. The condition dependent on the journey of the vehicle 600 may be dependent on the heating/cooling model 711. For example, given a current measured temperature 203 of the device 601, an expected level of heating/cooling and the heating/cooling model 711, it is possible to predict temperatures of the device 601 along the journey. If the combination of current measured temperature 203 of the device 601, expected levels of heating/cooling and the heating/cooling model 711, is such that a predicted temperature of the device 601 does not exceed a maximum operational temperature, then the condition tested at block 10 of the method 100 is satisfied. The heating/cooling model 711 provides advantages such as enabling switching to the second mode 111 at a point appropriate to a specific journey and/or specific vehicle.

In some, but not necessarily all examples, a heating/cooling model 711 may take as inputs one or more of: the measured temperature 203 of the device 601; who is driving the vehicle 600; one or more driving style parameters; at least one vehicle setting set by a vehicle occupant that affects the temperature of the device 601; a temperature and/or humidity outside the vehicle 600; how long the vehicle 600 is predicted to be left key-off at predicted waypoints along the journey.

In some, but not necessarily all examples a damage model 713 is used. The condition dependent on the journey of the vehicle 600 may be dependent on the damage model 713.

In some, but not necessarily all examples the damage model 713 comprises a model that predicts damage to the device 601 associated with device temperature, for example the damage model 713 comprises a time and/or frequency that a device temperature exceeds a threshold temperature such as the first threshold temperature 201 and/or the second threshold temperature 301 or some other temperature. In one example, the condition comprises one or more damage criteria, for example a predefined time and/or frequency over which a threshold temperature has been or will be exceeded. Therefore the method 100, at block 10, is dependent upon the actual or predicted time and/or frequency that a device temperature exceeds a threshold temperature and switches from the first mode 101 to the second mode 111 to prevent or reduce damage to the device 601. Damage may comprise, for example, thermal aging. The damage model 713 provides advantages such as enabling switching to the second mode 111 at a point appropriate to a specific journey and/or vehicle and/or a history of the vehicle use.

In some, but not necessarily all examples, a damage model 713 may take as inputs one or more of: condition/health monitoring of the device 601; how long the vehicle 600 is expected to stop at the journey destination and/or during the journey.

FIG. 7 also illustrates threshold temperature information 715 stored in memory 703. In some, but not necessarily all examples, threshold temperature information 715 comprises information on a value of a first temperature threshold 201 and a value of a second temperature threshold 301.

In some, but not necessarily all examples, threshold temperature information 715 varies. For example, the first threshold temperature 201 and/or second threshold temperature 301 may be varied. In some examples, the threshold temperature is optionally varied in dependence on a journey parameter 709, and/or a heating/cooling model 711, and/or a damage model 713. In such examples, any variation of the first and/or second threshold temperature 201, 301 would be such that the measured temperature 203 would still have to pass the first threshold temperature 201 without activation of the temperature control before passing the varied second threshold temperature 301 activating the temperature control. Advantages of varying the second threshold temperature 301 include dynamically controlling the rate of temperature change of the device 601, and enabling continued use of the second mode 111 without damaging the device 601, in spite of unexpected changes to the journey of the vehicle 600.

Any information stored in memory 703 in connection with the above elements 709, 711, 713, 715 could originate from user input, and/or from stored learned information concerning past vehicle journeys, and/or from data received from outside the vehicle 600 by means of conventional wireless communication methods. Said information may be shared between a plurality of vehicle systems by means of a vehicle communication network.

In some, but not necessarily all examples, a measured temperature 203 passes a first threshold temperature 201 when the measured temperature 203 has a value greater than an upper threshold value and additionally when the measured temperature 203 has a value less than a lower threshold value. In these examples, the method 100 at block 14 performs temperature control by cooling the device 601 of the vehicle 600 when the measured temperature 203 has a value greater than an upper threshold value and performs temperature control by warming the device 601 of the vehicle 600 when the measured temperature 203 has a value less than a lower threshold value. This is discussed further in relation to FIGS. 8A to 9B.

In the example of FIG. 8B, the temperature scale refers to increasing temperature. FIG. 8B illustrates an example of a measured temperature 203 passing above a first threshold temperature 201 and then passing below a third threshold temperature 801 and FIG. 8A illustrates corresponding activations 205 of temperature control according to a first mode 101 to cool the device 601 when the measured temperature 203 passes above the first threshold temperature 201 to warm the device 601 and when the measured temperature 203 passes below the third threshold temperature 801. Measured temperatures are shown with solid lines, and threshold temperatures are shown with horizontal dashed lines.

The effects of temperature control are also illustrated in FIGS. 8A and 8B, when the measured temperature 203 passes below the third threshold temperature 801 the temperature control increases the measured temperature 203 and reduces the difference between the measured temperature 203 and the third threshold temperature 801 until the measured temperature 203 no longer passes below the third threshold temperature 801 and the temperature control (warming) is consequently deactivated. While deactivation of temperature control is as a consequence, in this example, of the measured temperature 203 no longer passing below the third threshold temperature 801, other deactivation conditions may be used.

In the example, it should be appreciated that method 100 in the first mode 101 can comprise additional blocks similar to blocks 12, 14, but with reference to a different third threshold temperature 801. Switching block 10 of method 100 is associated with the third threshold temperature 801 and is optionally associated with a different condition.

In the example of FIG. 9B, the temperature scale refers to increasing temperature. FIG. 9B illustrates an example of a measured temperature 203 passing above a second threshold temperature 301 and then passing below a fourth threshold temperature 901 and FIG. 9A illustrates corresponding activations 305 of temperature control according to a second mode 111 to cool the device 601 when the measured temperature 203 passes above the second threshold temperature 301, and to warm the device 601 when the measured temperature 203 passes below the fourth threshold temperature 901. Measured temperatures are shown with solid lines, and threshold temperatures are shown with horizontal dashed lines.

The effects of temperature control are also illustrated in FIGS. 9A and 9B, when the measured temperature 203 passes below the fourth threshold temperature 901 the temperature control increases the measured temperature 203 and reduces the difference between the measured temperature 203 and the fourth threshold temperature 901 until the measured temperature 203 no longer passes below the fourth threshold temperature 901 and the temperature control (warming) is consequently deactivated. While deactivation of temperature control is as a consequence, in this example, of the measured temperature 203 no longer passing below the fourth threshold temperature 901, other deactivation conditions may be used.

There is therefore a period, where measured temperature 203 of the device 601 passes below the third threshold temperature 801 without activation of the temperature control of the device 601 before passing below the fourth threshold temperature 901 activating the temperature control (warming) of the device 601. Therefore the temperature control is no longer activated while a measured temperature 203 of the device 601 is between the third threshold temperature 801 and the fourth threshold temperature 901. This reduces energy consumption. This may increase a range of the vehicle 600, and reduce range anxiety in EV or PHEV users.

In the example, it should be appreciated that method 100 in the second mode 111 can comprise additional blocks similar to blocks 22, 24, but with reference to a different fourth threshold temperature 901. Switching block 10 of method 100 is associated with the fourth threshold temperature 901 and is optionally associated with a different condition.

In some, but not necessarily all examples, the first threshold temperature 201 and third threshold temperature 801 are lower threshold values, and the second threshold temperature 301 and fourth threshold temperature 901 are upper threshold values.

The skilled person would understand that the temperature management described above may also be applied to an internal combustion engine.

Where a structural feature has been described, it may be replaced by means for performing one or more of the functions of the structural feature whether that function or those functions are explicitly or implicitly described.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one . . . " or by using "consisting".

In this brief description, reference has been made to various examples. The description of features or functions in relation to an example indicates that those features or functions are present in that example. The use of the term 'example' or 'for example' or 'may' in the text denotes, whether explicitly stated or not, that such features or functions are present in at least the described example, whether described as an example or not, and that they can be, but are not necessarily, present in some of or all other examples. Thus 'example', 'for example' or 'may' refers to a particular instance in a class of examples. A property of the instance can be a property of only that instance or a property of the class or a property of a sub-class of the class that includes some but not all of the instances in the class. It is therefore implicitly disclosed that a features described with reference to one example but not with reference to another example, can where possible be used in that other example but does not necessarily have to be used in that other example.

Although embodiments of the present invention have been described in the preceding paragraphs with reference to various examples, it should be appreciated that modifications to the examples given can be made without departing from the scope of the invention as claimed. For example a plurality of devices 601 may be provided, the temperatures of which are controlled according to the modes described herein. Different conditions dependent on the journey of the vehicle 600 may be specified for each device 601. Different threshold temperatures may be specified for each device 601.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. A controller for activating temperature control of a device of a vehicle, the controller comprising:
    at least one processor and at least one memory including computer program code, the at least one memory and the computer program code configured to, with the at least one processor, cause the controller to:
    in a first mode, activate temperature control of the device of the vehicle when a measured temperature of the device passes a first threshold temperature;
    determine when a condition dependent on a journey of the vehicle is satisfied, and switching from the first mode to a second mode; and
    in the second mode, activate the temperature control of the device when the measured temperature of the device passes a second threshold temperature, different from the first threshold temperature, wherein in the second mode, the measured temperature of the device passes the first threshold temperature without activation of the temperature control of the device before passing the second threshold temperature activating the temperature control of the device.

2. The controller as claimed in claim 1, wherein the device is a charge storage device for providing energy for propulsion of the vehicle.

3. The controller as claimed in claim 1, wherein switching from the first mode to the second mode comprises deactivating the temperature control of the device if the temperature control is activated.

4. The controller as claimed in claim 1, wherein the condition dependent on the journey of the vehicle is dependent on a determination of at least one journey parameter that varies as the vehicle approaches a journey destination.

5. The controller as claimed in claim 4, wherein the determination of the at least one journey parameter comprises determining a distance of the vehicle from the journey destination, and/or predicting a time required for the vehicle to reach the journey destination.

6. The controller as claimed in claim 4, wherein the condition dependent on a journey of the vehicle is satisfied when the vehicle is a threshold closeness to the journey destination, the threshold closeness being dependent on a remaining distance and/or remaining time and/or remaining energy consumption to the journey destination.

7. The controller as claimed in claim 1, wherein the condition dependent on the journey is dependent upon a heating/cooling model of the device based on a predicted journey of the vehicle to a journey destination.

8. The controller as claimed in claim 7, wherein the heating/cooling model takes as inputs one or more of the following: the measured temperature of the device, who is driving the vehicle, one or more driving style parameters, at least one vehicle setting set by a vehicle occupant that affects the temperature of the device, a temperature and/or humidity outside the vehicle, and how long the vehicle is predicted to be left key-off at predicted waypoints along the journey.

9. The controller as claimed in claim 1, wherein the condition dependent on the journey is dependent upon a damage model of the device.

10. The controller as claimed in claim 9, wherein the damage model indicates thermal aging of the device.

11. The controller as claimed in claim 1, wherein the controller is further configured to vary the second threshold temperature.

12. The controller as claimed in claim 1, wherein the at least one memory and the computer program code are configured to, with the at least one processor, further cause the controller to:
    in the first mode, activate the temperature control of the device of the vehicle when the measured temperature of the device passes a third threshold temperature;
    determine when a condition dependent on the journey of the vehicle is satisfied, and switch from the first mode to the second mode; and
    in the second mode, activate the temperature control of the device when the measured temperature of the device passes a fourth threshold temperature, different from the third threshold temperature, wherein in the second mode, the measured temperature of the device passes the third threshold temperature without activation of the temperature control of the device before passing the fourth threshold temperature activating the temperature control of the device.

13. A device temperature control system, for a device of a vehicle, the device temperature control system comprising:
a heating or cooling system for temperature control of the device; and
a controller for the heating or cooling system, wherein the controller is the controller of claim 1.

14. The device temperature control system as claimed in claim 13, further comprising a charge storage device, wherein the device is the charge storage device.

15. The device temperature control system as claimed in claim 13, further comprising a vehicle navigation system configured to provide information used for determining when the condition dependent on a journey of the vehicle is satisfied.

16. A vehicle comprising the controller of claim 1.

17. The controller as claimed in claim 1, wherein the device is a device of an electric vehicle or plugin hybrid electric vehicle.

18. A method for activating temperature control of a device of a vehicle, comprising:
in a first mode, activating temperature control of the device when a measured temperature of the device passes a first threshold temperature;
determining when a condition dependent on a journey of the vehicle is satisfied, and switching from the first mode to a second mode; and
in the second mode, activating the temperature control of the device when the measured temperature of the device passes a second threshold temperature, different from the first threshold temperature, wherein in the second mode, the measured temperature of the device passes the first threshold temperature without activation of the temperature control of the device before passing the second threshold temperature activating the temperature control of the device.

19. A non-transitory computer readable medium storing a computer program comprising computer program instructions that, when performed by one or more processors, causes a system to:
in a first mode, activate temperature control of a device when a measured temperature of the device passes a first threshold temperature;
determine when a condition dependent on a journey of a vehicle is satisfied, and switching from the first mode to a second mode; and
in the second mode, activate the temperature control of the device when the measured temperature of the device passes a second threshold temperature, different to the first threshold temperature, wherein in the second mode, the measured temperature of the device passes the first threshold temperature without activation of the temperature control of the device before passing the second threshold temperature activating the temperature control of the device.

* * * * *